C. BROWN.
SHEET GLASS CLAMP.
APPLICATION FILED JULY 5, 1921.
1,431,928.  Patented Oct. 17, 1922.
FIG.1.  FIG.2.
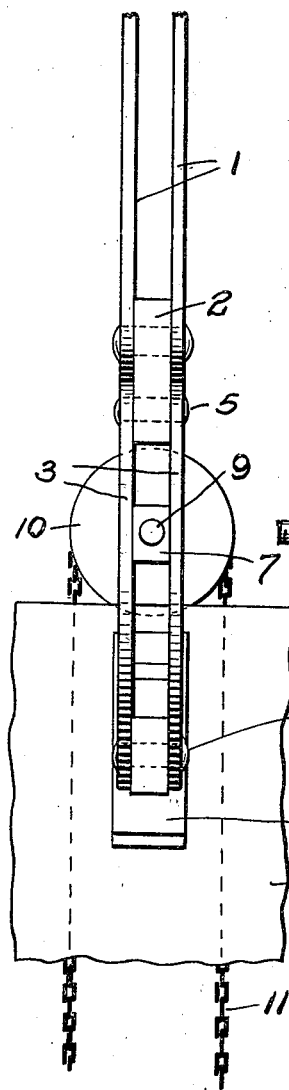
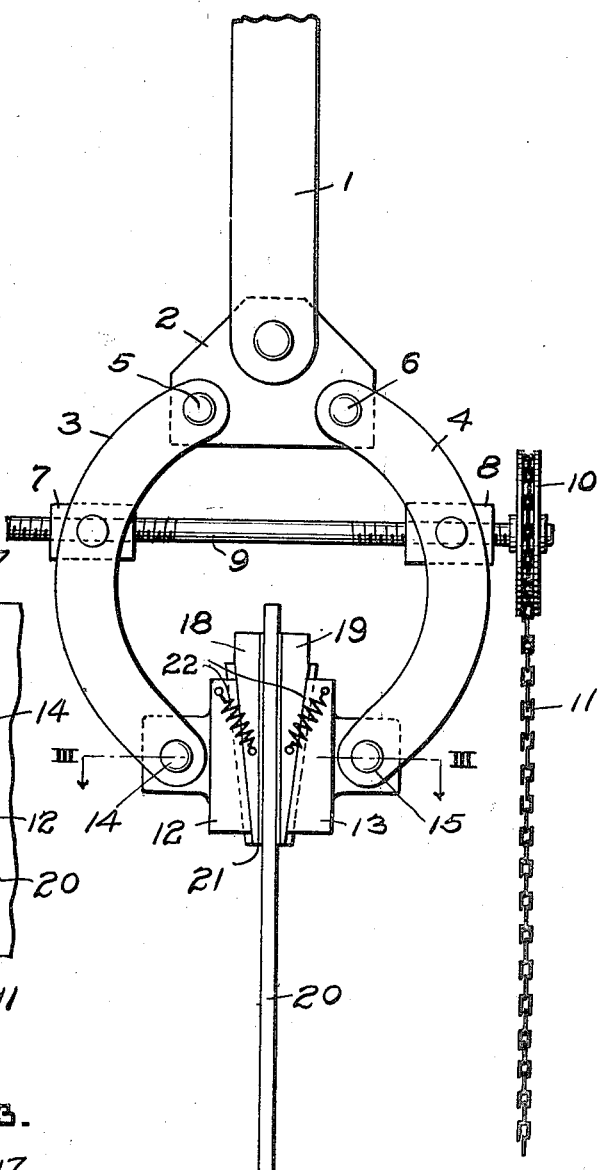
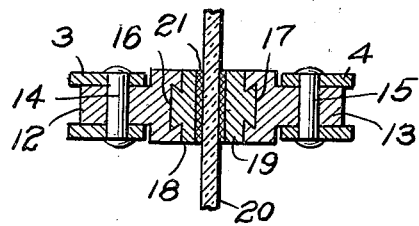
FIG.3.
INVENTOR
Christopher Brown
by
James C. Bradley
Atty.

Patented Oct. 17, 1922.

1,431,928

UNITED STATES PATENT OFFICE.

CHRISTOPHER BROWN, OF CHARLEROI, PENNSYLVANIA, ASSIGNOR TO PITTSBURGH PLATE GLASS COMPANY, A CORPORATION OF PENNSYLVANIA.

SHEET-GLASS CLAMP.

Application filed July 5, 1921. Serial No. 482,447.

*To all whom it may concern:*

Be it known that I, CHRISTOPHER BROWN, a citizen of the United States, and a resident of Charleroi, in the county of Washington and State of Pennsylvania, have made a new and useful Invention in Improvements in Sheet-Glass Clamps, of which the following is a specification.

The invention relates to clamps for gripping and transporting sheets of glass or other material in sheet form, and has for its principal objects the provision of a simple and very compact clamping means, which is easily manipulated and which will grip the sheets with a great degree of security, but without imposing an undue amount of pressure, such as might cause breakage where the material is of a fragile character. One embodiment of the invention is illustrated in the accompanying drawings, wherein:

Figure 1 is a side elevation of the clamp in use; Fig. 2 is a front elevation, and Fig. 3 is a section on the line III—III of Fig. 2.

The clamp is supported from above by means of the bar 1 connected at its upper end to a suitable transfer device, such bar being pivoted at its lower end to the plate 2 which serves as the connecting member between the arms 3 and 4. These arms are preferably both pivoted to the plate at 5 and 6, although it is not essential that both arms be movable, since all that is necessary is that the arms are relatively movable. The arms 3 and 4 are each made up of two plates as indicated in Fig. 1 and these plates carry between them the pivoted blocks 7 and 8, through which is threaded the adjusting bar 9. This bar has right hand threads at one end and left hand threads at the other, so that each arm is moved inward upon the rotation of the rod. The rotation of the rod is very conveniently secured by means of the wheel 10 secured at the end of the bar and operated by the endless chain 11 which extends down to a point within reach of the operator.

Also pivoted between the two bars constituting the side arms 3 and 4 at the lower end of such arms are the blocks 12 and 13. These blocks are carried by the pivot rods 14 and 15 and have their inner faces provided with dove tail grooves 16 and 17, as indicated in Fig. 3. These grooves form guideways for the jaws 18 and 19, the angle of the grooves being such, as indicated in Fig. 2, that on the downward movement of the jaws they are also given a movement of approach. A wedging action is thus secured upon the sheet of glass 20 or other material, and the lateral pressure upon the sheet increases with its weight, so that the gripping pressure is automatically adjusted to suit requirements. The range of this pressure depends upon the angle of the grooves carrying the jaws, and this can be modified to suit conditions. The jaws 18 and 19 are preferably faced with leather or rubber sheets 21 to give the necessary frictional grip upon the smooth surface of the sheet and to reduce the danger of fracturing the sheet. The jaws 18 and 19 are normally held in their upper positions by means of the coil springs 22.

In operation, in order to engage the sheet or plate, the jaws 18 and 19 are brought to position on opposite sides of the sheet and the chain 11 operated to turn the bar 9 and bring the jaws so that they engage or nearly engage the sides of the sheet. In case they do not quite engage they may be pressed down by the operator against the tension of the springs 22 until they grip the sides of the sheet, and upon the application of lifting force to the clamp the frictional contact between the sides of the sheet and the face of the jaws 18 and 19, causes these jaws to move downward slightly in their grooves and grip the sheet with such force that there is no danger of its being released accidentally. The pivotal connections between the blocks 12 and 13 and the supporting arms 3 and 4 permits the blocks to adjust themselves so that the jaws engage the sheet uniformly throughout their gripping areas. When the sheet reaches discharge position, the clamp is lowered until the lower edge of the glass sheet rests upon its support. The further downward movement of the clamp then tends to release the jaws 18 and 19, the springs 22 assisting in such release, but if this is not accomplished by this movement, the chain 11 is operated to move the arms 3 and 4 apart slightly and so release the sheet.

Among the advantages of the apparatus are its compact form, ease of operation and its safety. The clamp may be readily moved between glass racks where the space is more or less limited, and the engagement between the device and the sheets and the disengagement therefrom are very readily accomplished as heretofore indicated, the operator being relieved from the exercise of any discretion as to the amount of pressure to apply to the sheet since the pressure is automatically regulated by the angle of the jaws and the weight of the plate. There is thus no danger of the plate being gripped so tightly as to break it, on the one hand, as is sometimes the case where screw gripping or clamping devices are employed, and on the other hand, there is no danger that the clamp will not grip the plate with sufficient force to prevent its accidental release. After the plate is once gripped and suspended there is no possibility of its sliding through the clamp until the plate is supported upon its lower edge so as to take the weight off the jaws 18 and 19. The device may be cheaply constructed and the parts are such that they will not readily become so worn as to require replacement.

The construction is capable of considerable modification without departing from the spirit of the invention. Preferably the two sets of movable parts on opposite sides of the sheet are made similar and movable, but this is not necessarily the case, as all that is necessary is that one set of parts approach the other so that there is a relative movement such as will give the adjustment and clamping action desired. The bar 9 with its chain wheel constitutes a simple and effective device for giving the preliminary adjustment to the arms for holding them in position and for opening them, but various other devices might be employed for accomplishing this function. Similarly as to the inclined jaws 18 and 19, whereby a movement of approach between these jaws is secured as they move down. Other mechanical equivalents might be employed aside from the sliding wedges for securing this movement of approach as the jaws move down.

What I claim is:

1. In combination in a clamp for sheet material, a pair of arms mounted for relative movement toward and from each other, means for adjusting and fixing the relative position of the arms, blocks pivoted to the lower ends of the arms, and opposing jaws mounted on the blocks for movement vertically and for a movement of approach when moved downwardly.

2. In combination in a clamp for sheet material, a pair of arms mounted for relative movement toward and from each other, means for adjusting and fixing the relative position of the arms, blocks pivoted to the lower ends of the arms, and opposing jaws mounted on the blocks for movement vertically and for a movement of approach when moved downwardly and provided upon their gripping faces with facings of yielding material.

3. In combination in a clamp for sheet material, a pair of arms mounted for relative movement toward and from each other, means for adjusting and fixing the relative position of the arms, blocks pivoted to the lower ends of the arms, opposing jaws mounted on the blocks for movement vertically and also toward each other when the jaws are moved downwardly, and means for yieldingly maintaining the jaws in raised and separated relation when not in use.

4. In combination in a clamp for sheet material, a pair of arms mounted in relative movement toward and from each other, means for adjusting and fixing the relative position of the arms, blocks pivoted to the lower ends of the arms, and opposing jaws slidingly mounted on the blocks for vertical movement and for a movement of approach as the jaws move downwardly.

5. In combination in a clamp for sheet material, a pair of arms mounted for relative movement toward and from each other, means for adjusting and fixing the relative position of the arms, blocks pivoted to the lower ends of the arms, opposing jaws slidably guided on the blocks for vertical movement of approach as the jaws move downwardly, and means for yieldingly maintaining the jaws in raised and separated relation when not in use.

In testimony whereof, I have hereunto subscribed my name this 24th day of June, 1921.

CHRISTOPHER BROWN.